(12) United States Patent
Zinn

(10) Patent No.: US 6,996,399 B2
(45) Date of Patent: Feb. 7, 2006

(54) WIRELESS DEVICE AND METHOD USING FREQUENCY HOPPING AND SWEEP MODES

(75) Inventor: Ray Zinn, Atherton, CA (US)

(73) Assignee: Micrel, Inc., San Jose, CA (US)

( * ) Notice: Subject to any disclaimer, the term of this patent is extended or adjusted under 35 U.S.C. 154(b) by 189 days.

(21) Appl. No.: 10/341,994

(22) Filed: Jan. 13, 2003

(65) Prior Publication Data
US 2004/0198363 A1    Oct. 7, 2004

(51) Int. Cl.
*H04Q 7/20*    (2006.01)
(52) U.S. Cl. ............... 455/450; 455/41.2; 375/132; 375/133
(58) Field of Classification Search ............... 455/77, 455/87, 131, 150.1, 166.1, 166.2, 167.1, 455/168.1, 339, 450, 41.2; 375/132–138
See application file for complete search history.

(56) References Cited

U.S. PATENT DOCUMENTS

| 4,872,182 A | * | 10/1989 | McRae et al. ............... 375/141 |
| 5,377,222 A | * | 12/1994 | Sanderford, Jr. ............ 375/131 |
| 6,032,031 A | * | 2/2000 | Takaki ..................... 455/245.2 |
| 6,167,246 A | | 12/2000 | Elder et al. ................. 455/313 |
| 2002/0068541 A1 | * | 6/2002 | Helio et al. ................. 455/340 |

FOREIGN PATENT DOCUMENTS

EP    1 111 805 A2    6/2001

OTHER PUBLICATIONS

Micrel, Inc., MICRF003/033 QwikRadio™ 900 MHz UHF Receiver Preliminary Information, Oct. 1999, pp. 1-16.

* cited by examiner

*Primary Examiner*—Lester G. Kincaid
*Assistant Examiner*—Phuoc Doan
(74) *Attorney, Agent, or Firm*—Bever, Hoffman & Harms, LLP; Patrick T. Bever

(57) ABSTRACT

Device and method in a frequency hopping spread spectrum wireless communication system allow reception without the need to lock in synchronous steps with the frequency hopping channels. The transmitter will operate in the frequency hopping mode while the receiver operate in a frequency sweeping mode. The receiver has an IF pass band that effectively sweeps rapidly across the frequency hopping channels to intercept the active channel in the transmission spectrum. A less expensive radio could be manufactured while eliminating the complex receiver synchronization in the conventional frequency hopping scheme.

13 Claims, 5 Drawing Sheets

Freq. Hopping Scheme

Providing a transmission spectrum for transmitting data — 300

Partitioning the transmitting spectrum into a plurality of channels, each channel having a bandwidth $\Delta f_c$ — 310

Freq. Hopping Transmission

Transmitting data over a pseudo-random sequence of channels over time — 320

Freq. Sweeping Reception

Providing a reception passband having a bandwidth $\Delta f_{IF}$ commensurate with the channel's bandwidth $\Delta f_c$ — 330

Capturing the pseudo-random sequence of channels by effectively sweeping the predetermined transmission spectrum relative to the reception passband at a sufficient rate to acquire the data therein — 340

Extracting the data from the captured channels — 350

END — 360

*Fig. 7*

WIRELESS DEVICE AND METHOD USING FREQUENCY HOPPING AND SWEEP MODES

FIELD OF THE INVENTION

This invention relates to wireless Radio Frequency telecommunication and, in particular, to non-synchronous reception of frequency hopping spread spectrum transmission by acquisition through rapid sweeping of the transmission spectrum.

BACKGROUND OF THE INVENTION

Communication via radio frequency ("RF") devices is regulated by national and international regulatory agencies in order to ensure maximum utilization of limited spectral resources and to minimize interference. In the United States of America, the Federal Communication Commission ("FCC") regulates and licenses specific portions of radio frequency spectrum or bands for broadcast and other forms of RF communication.

A number of bands have been set aside for "Industrial Scientific and Medical" use, or the ("ISM") bands by the FCC. Utilization of these bands are unlicensed but is regulated by the FCC. For example, the 900 MHz band is used by a number of consumer wireless devices, such as cordless phones. The Wireless LAN under the IEEE 802.11 standard can have its physical layer operate in 2.4 GHz. Another unlicensed band is at 5.9 GHz.

The FCC regulation governing these ISM bands are documented in "Operation with the bands 902–928 MHz, 2400–2483.5 MHz and 5725–5875 MHz", Title 47 Part 15 Section 247) Code of Federal Regulations (47 CFR 15.247). The regulation stipulates the operation of either a frequency hopping or direct sequence spread spectrum intentional radiators. The regulation is based on consideration of reusing the same bands in multiple locations. Hence, transmissions in these bands are necessarily limited to low power applications, yet with high rejection of noise. When implementing with spread spectrum schemes the regulation specifies specific power spectrum density that must be adhered to.

FIG. 1 illustrates a frequency hopping spread spectrum scheme in which a transmission band is partitioned into multiple channels. The transmission spectrum is delimited by a lowest frequency f1 and a highest frequency f2. If the transmission spectrum is partitioned into N channels, each channel will have a bandwidth of $\Delta f_C = (f2-f1)/N$.

FIG. 2A shows a conventional frequency hopping spread spectrum communication system having a transmitter and a receiver. The transmitter transmits data through a pseudo-random sequence of channels in time. A local oscillator in the form of a voltage-controlled oscillator generates the carrier frequency band of a given channel. The VCO puts out a given channel at a time according to a sequence of predetermined pseudo-random numbers. In this way, the transmitter transmits equally on average over all the different channels in the transmission spectrum. The data is then said to be spread over the transmission spectrum even though at any one time it is confined to one of the channels.

The receiver includes a synchronization circuit that essentially helps tune into the current transmitting channel and the tuning must hop in synchronization with the transmission.

FIG. 2B illustrates the frequency hopping synchronization of channels between the transmitter and the receiver of FIG. 2A. Various schemes exist for synchronization. For example, a protocol provides a one-way hand-shaking to allow the receiver to lock into steps with the same pseudo-random sequence of the hopping transmitter. Another scheme allows the overheads in the transmission to tell the receiver where the next channel will be.

The conventional frequency hopping system has the transmission and reception synchronously spread over different narrow band channels at different times. This provides a communication system with high signal to noise ratio and low interference.

However, the need for synchronization of the receiver to the transmitter in a conventional frequency hopping system increases complexity and the need for higher precision in both the receiver and the transmitter. This results in more complicated and more expensive equipment and operation.

SUMMARY OF INVENTION

It is desirable to have a frequency hopping system without the need to synchronize the receiver with the transmitter.

It is also desirable to have a receiver that can receive from a frequency hopping transmitter without the need to synchronize with it.

A communication system with such advantages and objectives is accomplished by having the transmitter operating in a frequency hopping mode while the receiver operate in a frequency sweeping mode. The transmitter transmits by hopping from channel to channel selected pseudo-randomly from a plurality of such channels that span a given transmission spectrum. The receiver has a reception passband with a bandwidth commensurate with the bandwidth of the channel. The receiver effectively sweeps the transmission spectrum relative to the reception passband at a sufficient rate to capture the modulated signal carried in the received channels. Data is then extracted from the acquired modulated signal.

This scheme renders unnecessary the need for the receiver to lock in synchronous steps with the frequency hopping channels. A less expensive radio could be manufactured while eliminating the complex receiver synchronization in the conventional frequency hopping scheme.

Additional features and advantages of the present invention will be understood from the following description of its preferred embodiments, which description should be taken in conjunction with the accompanying drawings.

BRIEF DESCRIPTION OF THE DRAWINGS

FIG. 7 is a flow diagram illustrating the radio communication of transmitting in frequency hopping mode and receiving in frequency sweeping mode.

DETAILED DESCRIPTION OF THE PREFERRED EMBODIMENTS

Figure 1:
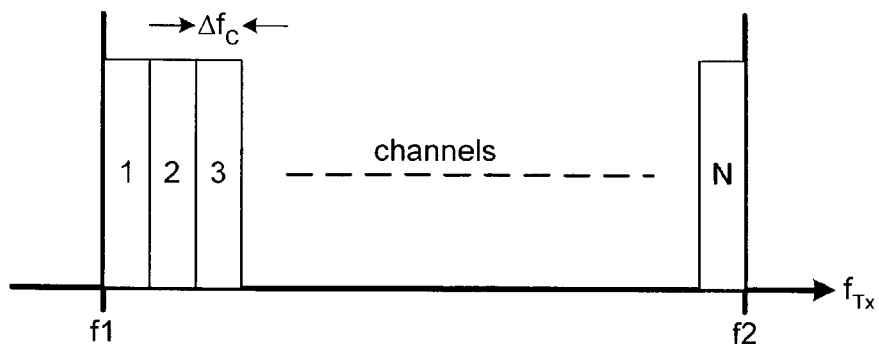
FIG. 1 illustrates a frequency hopping spread spectrum scheme in which a transmission band is partitioned into multiple channels.
Figure 2A:
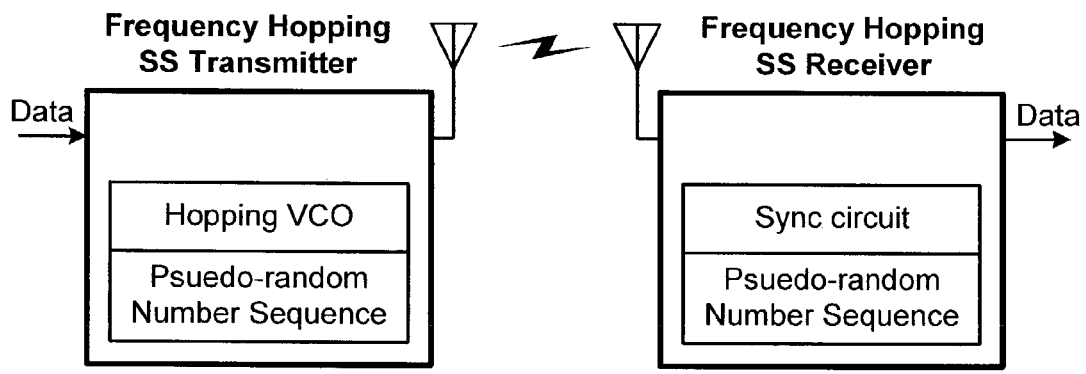
FIG. 2A shows a conventional frequency hopping spread spectrum communication system having a transmitter and a receiver.
Figure 2B:
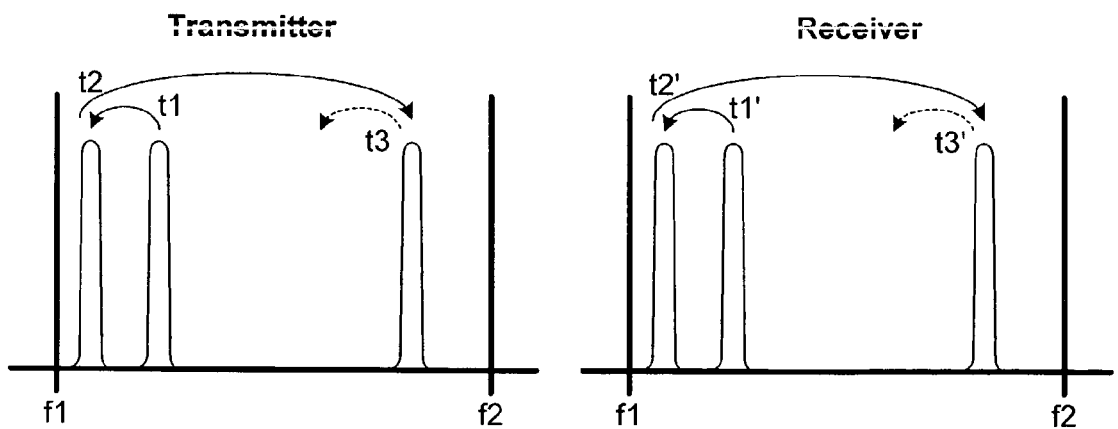
FIG. 2B illustrates the frequency hopping synchronization of channels between the transmitter and the receiver of FIG. 2A.
Figure 3A:
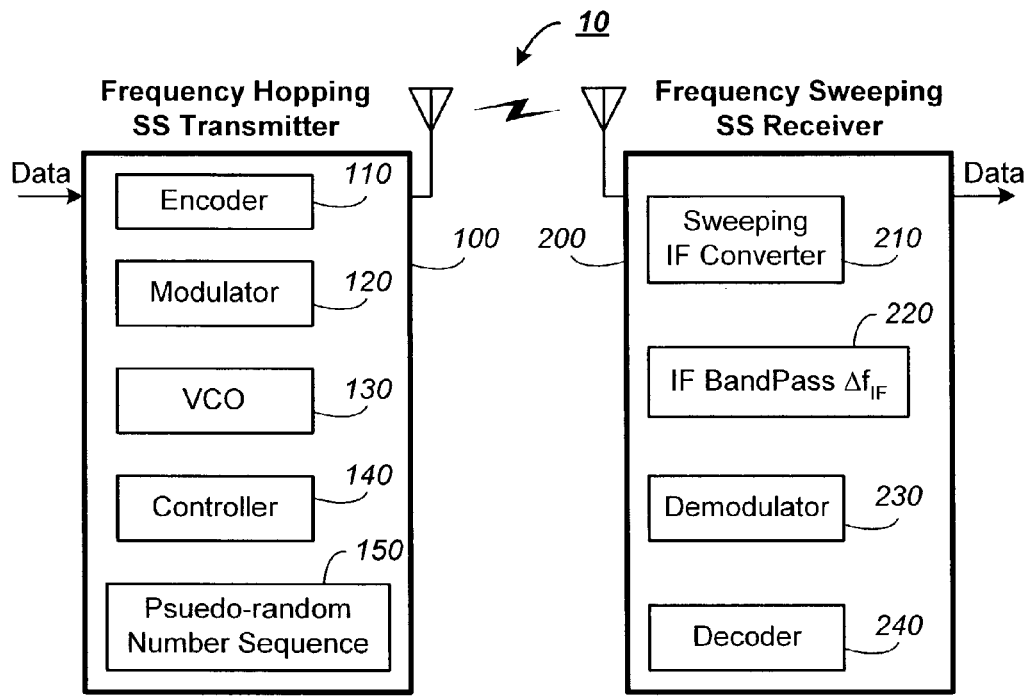
FIG. 3A illustrates schematically a frequency hopping spread spectrum system according to a general embodiment of the present invention.

FIG. 3A illustrates schematically a frequency hopping spread spectrum system according to a general embodiment of the present invention. The system 10 has data being sent by a transmitter 100 wirelessly to a receiver 200.

The transmitter 100 essentially allows data to modulate a frequency-hopping carrier before emitting out through an antenna. An encoder 110 encodes the data into a baseband signal. A modulator 120 uses the baseband signal to modulate a carrier signal. The carrier signal is provided by a local oscillator in the form of a voltage-controlled oscillator VCO 130. A controller 140 responsive to a pseudo-random number sequence 150 controls the VCO 130 to generate the frequency-hopping carrier. As described earlier, in the frequency-hopping scheme, the transmission spectrum is partitioned into a plurality of narrower band channels. The carrier assumes one of these channels at any one time and hops around the different channels in time, essentially performing a random walk on the channels spanning the transmission spectrum in accordance with the pseudo-random number sequence 150.

The receiver 200 of the present invention differs from conventional frequency hopping spread spectrum receivers in that it operates in a frequency sweeping mode instead of a frequency hopping mode. It is not synchronous with the transmitter 100 in the sense that it does not tune into the transmitting channel and locks in steps with the hopping. The receiver 200 includes a sweeping, intermediate frequency ("IF") converter 210, which operates in a superheterodyne manner by mixing the received RF transmission signal with a signal generated by a local oscillator ("LO"). The resultant beat signal is therefore at an intermediate frequency given by the difference of the transmission frequency and the LO frequency. An IF bandpass module 220 filters the converted IF signal to a predetermined IF band with a predetermined bandwidth $\Delta f_{IF}$ centered around $f_{IF}$. Thus, the LO in the sweeping IF converter 210 puts out a sweeping frequency that effectively sweeps the transmission spectrum into the predetermined IF band. A demodulator 230 extracts the baseband signal from the IF. A decoder 240 then decodes the baseband signal back to data.

Figure 3B:
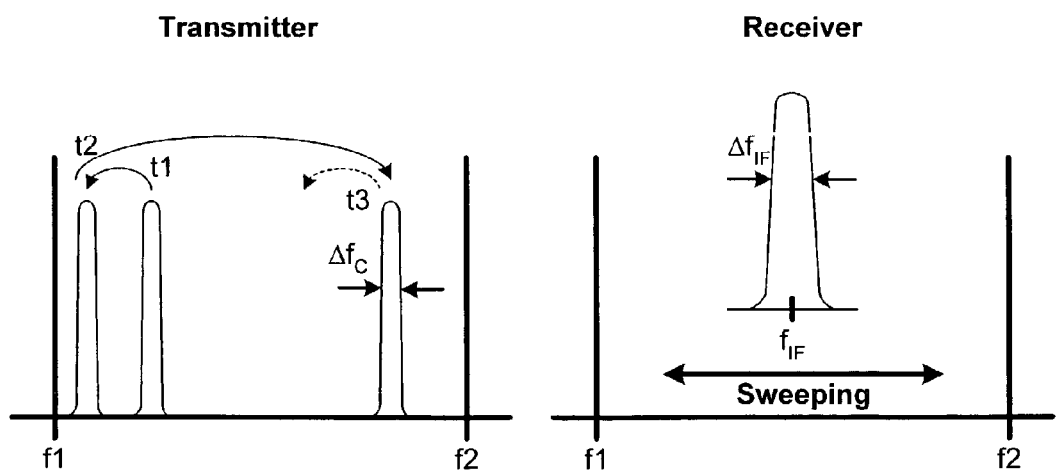
FIG. 3B illustrates the spectral activity of the transmitter and the receiver shown in FIG. 3A.

FIG. 3B illustrates the spectral activity of the transmitter and the receiver shown in FIG. 3A. The transmission spectrum has a lowest frequency of f1 and a highest frequency of f2. At times t1, t2, t3, . . . the transmitter hops pseudo-randomly from one channel to another within the transmission spectrum. If the transmission spectrum is partitioned into N channels, then the transmitter is configured to operate in any one of these N channels, each having bandwidth $\Delta f_C = (f2-f1)/N$.

At the receiver side, the IF bandpass module 220 sets up an IF bandpass portal centered at $f_{IF}$ and configured with a predetermined bandwidth $\Delta f_{IF}$. The sweeping IF converter 210 repeatedly scans through a range of frequencies that effectively sweeps the transmission spectrum through the IF bandpass portal. The sweeping rate across a given frequency range must be sufficiently high to capture all the data at a given data rate. Conversely, a faster sweep rate will allow a higher data rate, with the upper limit being the response time of the IF bandpass module 220.

Figure 4A:
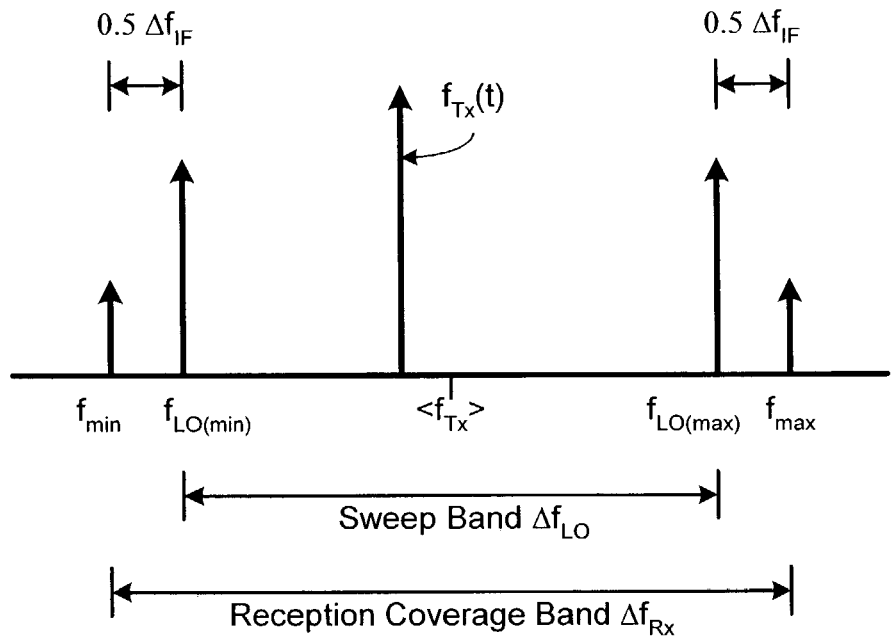
FIG. 4A illustrates the frequency scheme of the receiver.

FIG. 4A illustrates the frequency scheme of the receiver. The local oscillator LO in the sweeping IF converter 210 sweeps through a frequency range $\Delta f_{LO}$ given by $f_{LO(min)}$ at the lower end and $f_{LO(max)}$ at the higher end. This range is preferably centered around the middle of the transmission spectrum $<f_{TX}>$. Since the IF bandpass module 220 has a bandwidth of $\Delta f_{IF}$, the sweeping is extended by 0.5 $\Delta f_{IF}$ on either end. The receiver 200 therefore has an effective coverage band extended from $f_{min}$ to $f_{max}$, with a bandwidth given by $\Delta f_{RX} = \Delta f_O + \Delta f_{IF}$.

Figure 4B:
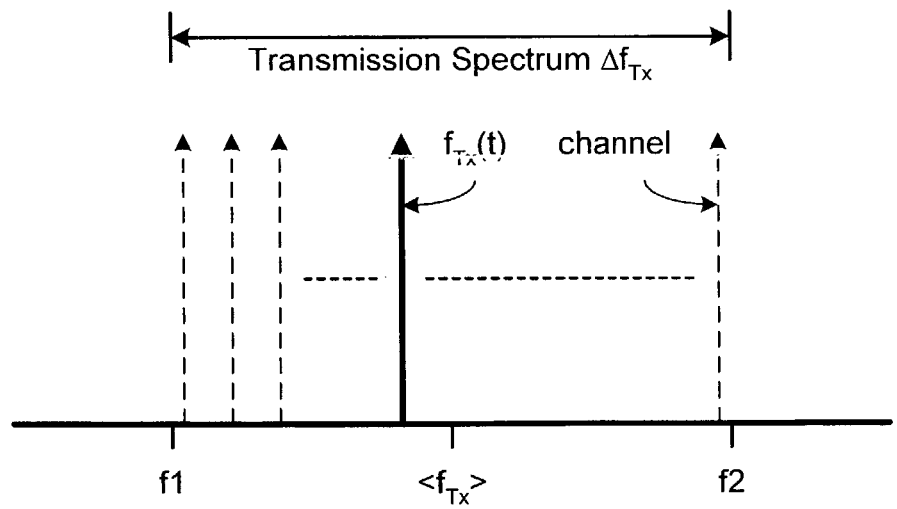
FIG. 4B illustrates the transmission spectrum in which the transmitter operates.

FIG. 4B illustrates the transmission spectrum in which the transmitter operates. The transmission spectrum has frequency f1 at its lower limit and f2 at its upper limit, spanning a bandwidth of $\Delta f_{TX}$. Each channel in the transmission spectrum is represented by a broken arrow. The channel in which the transmitter is currently in is represented by a solid arrow.

In order to capture the transmission fully, the receiver 200 must at least have a reception coverage band that is inclusive of the transmission spectrum. In the preferred implementation, the reception coverage band is larger than the transmission spectrum by a predetermined margin to allow for transmit frequency ambiguity, based on factors such as transmitter misalignment, aging and temperature.

Figure 5:
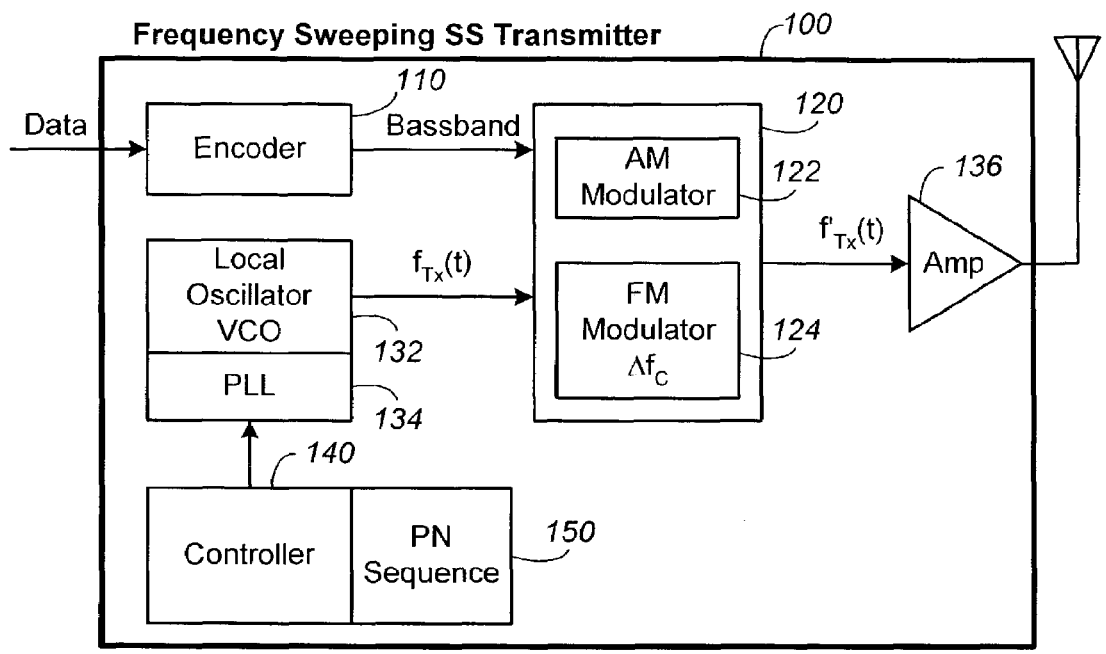
FIG. 5 is a more detailed schematic diagram of the frequency hopping transmitter shown in FIG. 3A, according to a preferred embodiment of the present invention.

FIG. 5 is a more detailed schematic diagram of the frequency hopping transmitter shown in FIG. 3A, according to a preferred embodiment of the present invention. Essentially, the data is encoded by the encoder 110 into a baseband signal (e.g. Manchester encoded). In the preferred embodiment, the modulator 120 includes an amplitude modulator 122 (e.g. On-OFF keyed). The baseband signal bit rate is typically between 1 to 5 kbps and is inputted to the modulator 120 to amplitude modulate a carrier signal $f_{TX}(t)$. The resultant modulated carrier signal $f_{TX}(t)$ is then amplified by an RF amplifier 136 and emitted through an antenna. The RF amplifier 136 is configured to have the transmitter 100 emits at a predetermined power.

In another preferred embodiment in which data integrity is critical in an application, the baseband encoding includes error detection and/or correction codes. In more sophisticated applications, where the transmitter and the receiver are both transceivers, a simple transmission protocol is also included. In this way, any transmission error at the receiver can be detected and either corrected or the data is re-transmitted.

The carrier signal $f_{TX}(t)$ assumes at any one time one of plurality of channels of the transmission spectrum. Each channel has a bandwidth $\Delta f_C$ which is a fraction of the total transmission spectrum. During different time periods, the carrier signal is carried by a succession of channels. The sequence of channels is determined by the pseudo-random sequence 150. For example, the pseudo-random sequence is generated by maximal length sequence polynomial $x^6+x+1$. The controller 140, in reference to the pseudo-random sequence 150, controls the local oscillator 132 in the form of a voltage-controlled oscillator in combination with a phase-locked loop ("PLL") to put out the channel hopping carrier signal $f_C$.

One feature of the transmitter 100 includes frequency modulation ("FM") of the carrier signal. This is accomplished by a FM modulator 124. This feature provides adjustment of the channel bandwidth $\Delta f_C$ as will be discussed in connection with compliance of rules of regulatory authorities.

In a preferred implementation, a multifunction processor is used to perform at least some of the functions of the pseudo-random generation 150, the controller 140 and the encoder 110. For example, such a processor is available commercially as a communication controller chip, such as the Mixed Signal Microcontroller, MSP 430F1121IPW manufactured by Texas Instruments, Incorporated, Dallas, Tex., U.S.A.

One important consideration is for the transmitter and receiver to comply with the rules of any communication regulatory authorities that may apply. The rules and regulations are applied to allow efficient utilization of the telecommunication medium and allocation of spectrum while ensuring minimum interference. For example, in the United States of America, FCC's regulation codified in Title 47, Part 15, Section 247 stipulates the operation of "intentional radiators" within the bands 902–928 MHz, 2400–2483.5 MHz, and 5725–5850 MHz. In particular, for frequency hopping systems the following regulations apply:

1) The emitted power must not exceed 1 Watt.

2) Channel carrier frequencies separation must be greater or equal to 25 kHz or 20 dB bandwidth of the hopping channel, whichever is greater.

3) Each channel must be equally used on average.

4) In the 902–928 MHz band: if the 20 dB bandwidth is greater than 250 kHz, the system shall use at least 50 hopping frequencies and the occupancy on each must be less than or equal to 0.4 s in a 20 s period. If the 20 dB bandwidth is greater than 50 kHz but not more than 500 kHz, the system shall use at least 25 hopping frequencies and the occupancy on each must be less than or equal to 0.4 s in a 10 s period.

Thus, within the prescribed and regulated ISM bands, by appropriate adjustment of the transmitters parameters, various compliant configurations of the frequency-hopping transmitter 100 are possible.

Figure 6:
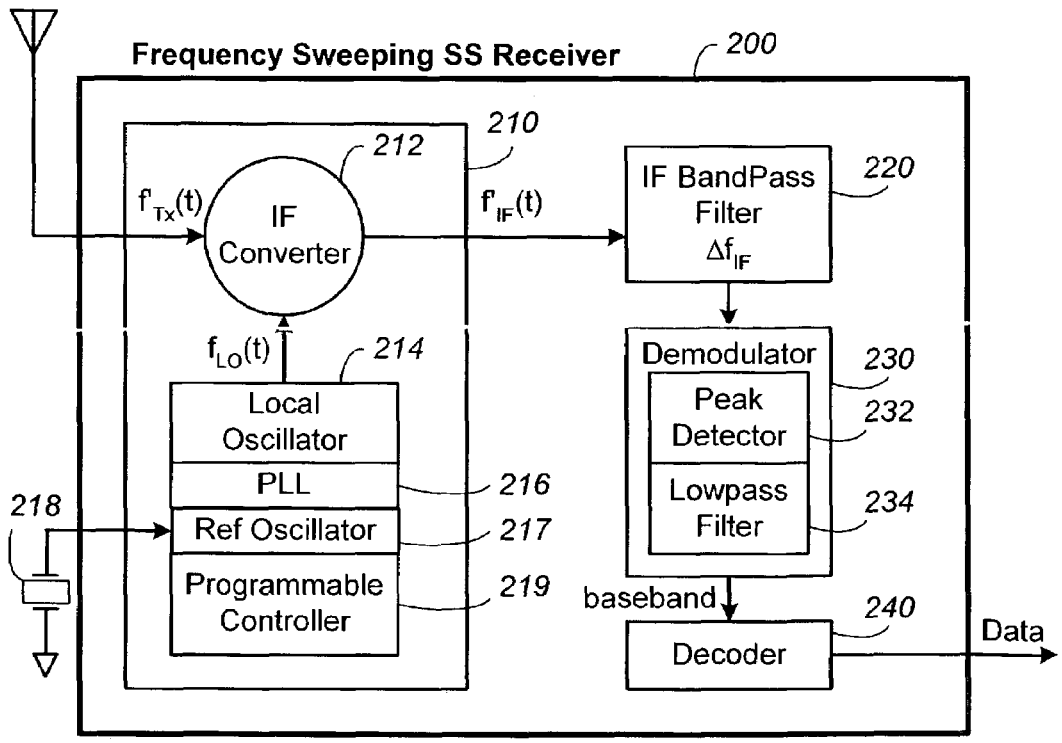
FIG. 6 is a more detailed schematic diagram of the frequency sweeping receiver shown in FIG. 3A, according to a preferred embodiment of present invention.

FIG. 6 is a more detailed schematic diagram of the frequency sweeping receiver shown in FIG. 3A, according to a preferred embodiment of present invention. The modulated signal $f_{TX}(t)$ emitted by the transmitter 100 shown in FIG. 5 is received by an antenna and inputted into the sweeping IF converter 210. The sweeping IF converter converts $f_{TX}(t)$ into a modulated signal with an intermediate frequency $f_{IF}(t)$. The IF bandpass module 220 includes a bandpass filter that passes only a predetermined band of the IF having a predetermined frequency and bandwidth $\Delta f_{IF}$. The bandpass signal is then demodulated by the demodulator 230 to extract the baseband signal. The decoder 240 then decodes the baseband signal to obtain the data.

In the preferred embodiment, the IF bandpass filter 220 is programmable and the IF passband is selectable through a programmable controller 219.

The receiver's demodulation is the inverse of the transmitter's modulation. In the preferred embodiment, the transmitter's modulation is an amplitude modulation. The receiver's demodulator 230 is implemented by a peak detector 232 followed by a smoothing low pass filter 234 to extract the baseband signal.

The receiver's decoding is the inverse of the transmitter's encoding. If error detection or correction codes are implement in the transmission, the decoding will include error codes processing. If the receiver 200 is part of a transceiver and transmission protocol is implemented, further protocol transactions can be handled by a controller.

The IF converter 210 is to mix the received modulated signal $f_{TX}(t)$ with a sweeping local signal $f_{LO}(t)$ to produce a beat signal at a modulated intermediate frequency $f_{IF}$.

The local signal $f_{LO}(t)$ is preferably generated by a local oscillator 214 that has a dual-modulus frequency divider operating on a reference frequency. The reference frequency is provided by a reference oscillator 217 in combination with a phase-locked loop 216. A user-configurable resonator 218, such as a crystal, or more economically a ceramic resonator sets the frequency of the reference oscillator.

In the preferred embodiment, the receiver can sweep its local oscillator 214 by switching between two modulus settings, N1 and N2. In this way, analog sweeping is realized by the loop dynamics of frequency settling between the two frequency endpoints, $f_{min}$ and $f_{max}$, defined by N1 times the reference frequency and N2 times the reference frequency.

The local oscillator sweeps frequency in a sawtooth pattern, effectively sweeping the IF passband (if reflected to the input RF frequency) across the frequency span defined by the two frequency endpoints (see FIG. 4A.) If a carrier is dwelling at a particular frequency within the frequency endpoints and the swept passband intersects the signal, the IF filter/peak detector will have a positive voltage response. If no signal is present, a less-positive voltage proportional to the noise power will result.

The sweep rate is set by signal switching the modulus select. This signal is typically generated by the programmable controller 219. The sweep rate is typically many times faster than the data rate. If a "1" state (mark) is being transmitted, the effective spectrum for that time period is simply the carrier frequency. When the carrier frequency is temporally contained within the effective IF passband, the filter/peak detector output is positive and this will result in a series of narrow pulses across the "1" data state. Where there exists a "0" state, the filter/peak detector output is less positive and interpreted as the noise floor. By using a sufficiently fast sweeping rate and a peak detector for the envelope detection process with appropriately adjusted attack and decay time constants, the baseband signal will be recovered with great efficiency.

Generally, in the extreme case of the sweep rate increasing toward infinity, the system response approaches that of a continuous or fixed local oscillator, in which case the full modulation envelope is recovered. Conversely, sweeping the local oscillator too slowly will result in loss of signal due to droop associated with the peak detector decay time constant and result in a corresponding reduction in signal-to-noise ratio. However, for a given IF filter bandwidth, if the local oscillator's sweep is too fast, the response time of the IF filter becomes the determining factor in recovered modulation envelope.

Between the two limiting cases, an optimum sweep rate exists that provides an optimum system performance for a given IF filter's frequency and bandwidth. The sweep rate can be normalized into the average number of times that the local oscillator sweeps from $f_{min}$ to $f_{max}$ over a data bit time of the data that is being recovered. Analysis identifies that this optimum range is between 4 and 10 sweeps (or hits) per bit time for the particular IF filter. In the preferred embodiment, the receiver 200 uses 7 hits per data bit.

An alternative embodiment for the sweeping the local oscillator 214 is to drive it with a swept frequency precision timing signal. Such an approach provides an alternative to the dual module division is within the local oscillator.

An alternative to sweeping the local oscillator 214 is to sweep the IF filter 220. This is accomplished by control to vary the IF filter's center frequency and should yield the same performance as sweeping the local oscillator.

In a preferred implementation, a multifunction processor is used to perform at least some of the functions of the controller 219, the demodulator 230 and the decoder 240. For example, such a processor is available commercially as a communication controller chip, such as the Mixed Signal Microcontroller, MSP 430F1121IPW manufactured by Texas Instruments, Incorporated, Dallas, Tex., U.S.A.

A receiver capable of operating in a sweep mode but contemplated for reception of AM transmission of substantially fixed carrier frequency is disclosed in U.S. Pat. No. 6,167,246, assigned to the same assignee as the present invention. The entire disclosure of U.S. Pat. No. 6,167,246 is hereby incorporated herein by reference. A family of related sweeping mode receiver chips has been manufactured by Micrel, Inc. of San Jose, Calif., U.S.A., the assignee of the present invention. A document, "MICRF003/003 QwikRadio™900 MHz UHF Receiver—Preliminary Information," Micrel Inc., October 1999, is available from www-.micrel.com. The entire disclosure of this document is hereby incorporated herein by reference.

With regard to the FCC regulation, the rules stipulate for a synchronous frequency-hopping receiver that the receiver bandwidth must match the emitted bandwidth on each channel and must tune synchronously with the transmitted carrier frequency.

While not conforming literally to the exact letters of the FCC regulation as stipulated in Title 47 Part 15, Section 247, the present invention can be interpreted to satisfy the requirements equivalently. First, the receiver passband bandwidth $\Delta f_{IF}$ is set to be commensurate with the channel's bandwidth $\Delta f_C$. This is accomplished by adjusting either $\Delta f_C$ or $\Delta f_{IF}$ or both. Secondly, the receiver 200 can be regarded as tuned synchronously with the emitted spectrum only at the point of interception during the local oscillator sweep. The FCC has approved such equivalent interpretation of the regulations in question, thereby allowing a new class of communication devices and systems prescribed by the present invention to be compliant.

Preferably, the receiver passband bandwidth $\Delta f_{IF}$ is greater than the channel's bandwidth $\Delta f_C$ (see FIG. 3B) to allow for component tolerances and temperature variations. A receiver IF bandpass $\Delta f_{IF}$ is said to be commensurate with the channel's bandwidth $\Delta f_C$ if it is substantially one to two times $\Delta f_C$. This will ensure the receiver to work over production and environmental tolerances and variations. For example, in the upper limit, a transmitter may have $\Delta f_C$ with a 20 dB bandwidth of 500 kHz while the receiver has a $\Delta f_{IF}$=1.18 MHz.

FIG. 7 is a flow diagram illustrating the radio communication of transmitting in frequency hopping mode and receiving in frequency sweeping mode.

Step 300: Providing a transmission spectrum for transmitting data.

Step 310: Partitioning the transmitting spectrum into a plurality of channels, each channel having a bandwidth $\Delta f_C$.

Step 320: Transmitting data over a pseudo-random sequence of channels over time.

Step 330: Providing a reception passband having a bandwidth $\Delta f_{IF}$ commensurate with the channel's bandwidth $\Delta f_C$.

Step 340: Capturing the pseudo-random sequence of channels by effectively sweeping the predetermined transmission spectrum relative to the reception passband at a sufficient rate to acquire the data therein.

Step 350: Extracting the data from the captured channels.
Step 360: End.

It can be seen from the foregoing disclosure that a frequency hopping communication system can be simplified considerably when the receiver need not be synchronized with the transmitter. Low cost radio devices and systems may be built based on the present invention. Such radio devices and systems are useful in low data rate wireless applications with a range up to about 1000 km. Examples of such applications include utility metering, machine and equipment monitoring and metering, and remote control.

Although the various aspects of the present invention have been described with respect to certain embodiments, it is understood that the invention is entitled to protection within the full scope of the appended claims.

The invention claimed is:

1. A method of radio communication, comprising:
providing a predetermined transmission spectrum for transmitting data;
configuring a plurality of channels, each operating in a band with a predetermined bandwidth and occupying a portion of said predetermined radio frequency spectrum;
transmitting said data over a predetermined sequence of said plurality of channels over time at a bit rate that is set such that a data bit of said data is transmitted on a selected channel of said plurality of channels for a predetermined data bit time;
providing a reception passband having a bandwidth commensurate with the predetermined bandwidth of the channel;
capturing the predetermined sequence of channels over time by effectively sweeping the predetermined transmission spectrum relative to said reception passband at a sufficient sweep rate such that the selected channel is captured a plurality of times during the predetermined data bit time to acquire the data therein; and
extracting the data from the captured channels.

2. The method of radio communication as in claim 1, wherein the effectively sweeping is performed with said reception passband stationary relative to the predetermined transmission spectrum.

3. The method of radio communication as in claim 1, wherein the effectively sweeping is performed with the predetermined transmission spectrum stationary relative to said reception passband.

4. The method of radio communication as in any one of claims 1–3, wherein the bandwidth of said reception passband is between one to two times of the predetermined bandwidth of the channel.

5. A method of receiving data carried by a RF signal in a sequence of frequency hopping transmission channels within a predetermined transmission spectrum, each channel having a predetermined bandwidth, each data bit of said data being transmitted on an associated channel of said plurality of channels for a predetermined data bit time, said receiving method comprising:
providing a reception passband having a bandwidth commensurate with the predetermined bandwidth of the channel;
capturing the predetermined sequence of channels over time by effectively sweeping the predetermined transmission spectrum relative to said reception passband at a sufficient sweep rate such that each of the plurality of channels is captured a plurality of times during the predetermined data bit time; and
extracting the data from the captured channels.

6. The method as in claim 5, wherein the effectively sweeping is performed with said reception passband stationary relative to the predetermined transmission spectrum.

7. The method as in claim 5, wherein the effectively sweeping is performed with the predetermined transmission spectrum stationary relative to said reception passband.

8. The method as in claim 5, wherein the bandwidth of said reception passband is between one to two times of the predetermined bandwidth of the channel.

9. A radio receiver for receiving data carried by a RF signal in a sequence of frequency hopping transmission channels within a predetermined transmission spectrum, each channel having a predetermined bandwidth, each data bit of said data being transmitted on an associated channel of said sequence of frequency hopping transmission channels for a predetermined data bit time, said radio receiver comprising:
- a bandpass filter providing a reception band having a bandwidth commensurate with the predetermined bandwidth of the channel;
- a sweeping frequency converter for sweeping over a spectral range commensurate with the transmission spectrum and converting individual frequencies therein to overlap with said reception band at a sufficient sweep rate such that each associated channel of said sequence of frequency hopping transmission channels is captured a plurality of times during each predetermined data bit time to allow any channels within the transmission spectrum to be swept through said bandpass filter in order to acquire the data therein; and
- an extractor coupled to said bandpass filter for extracting the data from its carrying signal.

10. The radio receiver as in claim 9, wherein said sweeping frequency converter sweeps with said reception passband stationary relative to the predetermined transmission spectrum.

11. The radio receiver as in claim 9, wherein said sweeping converter sweeps with the predetermined transmission spectrum stationary relative to said reception passband.

12. The radio receiver as any one of claims 9–11, wherein the bandwidth of said reception passband is between one to two times of the predetermined bandwidth of the channel.

13. A radio receiver for receiving data carried by a RF signal in a sequence of frequency hopping transmission channels within a predetermined transmission spectrum, each channel having a predetermined bandwidth, each data bit of said data being transmitted on an associated channel of said sequence of frequency hopping transmission channels for a predetermined data bit time, said radio receiver comprising:
- a bandpass filter providing a reception band having a bandwidth commensurate with the predetermined bandwidth of the channel;
- means for sweeping over a spectral range commensurate with the transmission spectrum and converting individual frequencies therein to overlap with said reception band at a sufficient sweep rate such that each associated channel of said sequence of frequency hopping transmission channels is captured a plurality of times during each predetermined data bit time to allow any channels within the transmission spectrum to be swept through said bandpass filter in order to acquire the data therein; and
- an extractor coupled to said bandpass filter for extracting the data from its carrying signal.

* * * * *